United States Patent [19]

Miura et al.

[11] Patent Number: 4,733,305
[45] Date of Patent: Mar. 22, 1988

[54] CONVERSATIONAL PICTURE PROCESSING SYSTEM

[75] Inventors: Shuuichi Miura; Tadashi Fukushima; Yoshiki Kobayashi, all of Hitachi; Masao Takatoo, Katsuta; Yoichi Takagi, Hitachi, all of Japan

[73] Assignee: Hitachi, Ltd., Tokyo, Japan

[21] Appl. No.: 712,031

[22] Filed: Mar. 15, 1985

[30] Foreign Application Priority Data

Mar. 16, 1984 [JP] Japan ................................. 59-49117

[51] Int. Cl.$^4$ ............................................. H04N 1/40
[52] U.S. Cl. .................................... 358/280; 358/256; 364/514
[58] Field of Search ............... 358/280, 282, 284, 286; 364/514

[56] References Cited

U.S. PATENT DOCUMENTS

| | | | |
|---|---|---|---|
| 4,205,341 | 5/1980 | Mitsuya | 358/282 |
| 4,400,738 | 8/1983 | Tomory | 358/284 |
| 4,491,961 | 1/1985 | Sutton | 358/284 |
| 4,514,767 | 4/1985 | Kubota | 358/284 |
| 4,551,768 | 11/1985 | Tsuchiya | 358/284 |
| 4,587,633 | 5/1986 | Wang et al. | 358/256 |
| 4,604,653 | 8/1986 | Shimizu | 358/257 |

FOREIGN PATENT DOCUMENTS

| | | | |
|---|---|---|---|
| 0063172 | 5/1980 | Japan | 358/284 |
| 0052983 | 5/1981 | Japan | 358/284 |
| 0211875 | 12/1982 | Japan | 358/282 |

Primary Examiner—Edward L. Coles, Sr.
Attorney, Agent, or Firm—Antonelli, Terry & Wands

[57] ABSTRACT

A conversational picture processing system having a temporary memory for storing picture processing commands inputted by an operator. The system executes picture processing commands inputted by the operator, displays processed picture as a result of execution of each command, and stores the commands in the temporary memory. The system reads out a picture processing command specified by the operator from the temporary memory and stores the command as a registered command in a command list memory within the system.

6 Claims, 17 Drawing Figures

CONVERSATIONAL PICTURE PROCESSING SYSTEM

BACKGROUND OF THE INVENTION

1. Field of the Invention

The present invention relates to a picture processing system operable to execute picture processing commands and allow the description of a picture processing procedure using the picture processing commands, and particularly to a picture processing system capable of developing a picture processing procedure through the conversational operation with the operator for evaluating the result of picture processing on a trial-and-error basis.

2. Description of the Prior Art

Picture processing, in which the removal of noises from a displayed picture (i.e., smoothening) or the conversion of 8 bit monochrome display into binary monochrome display (i.e., fixed binarization) etc. is carried out, and the picture processing is carried out generally by executing a plurality of picture processing commands. When a picture processing procedure, i.e., a series of picture processing commands, is registered in the conventional picture processing system, the commands are registered directly in the command list memory provided as a picture processing command table, instead of being stored temporarily prior to the registration and use. There are two conventional methods for developing picture processing procedures using the above-mentioned system. In one method, when a user or operator inputs a picture processing command to the picture processing system, the system executes the command, and when the operator inputs a display command, the system executes the display command and displays the result on the screen. The operator views the display, and instructs the system to register the picture processing command when he considers that the command is preferable. In this method, the inputted command is cancelled, therefore, if the operator tries several picture processing commands and, in consequence of the trial, wishes to register one of them, he must make an operation to enter that command again.

Another method is to register all picture processing commands for describing a picture processing procedure in the command list memory and, thereafter, to execute the registered commands from the beginning to the end. This method does not allow the operator to check the result of each command execution, and therefore, in order to carry out an efficient development of picture processing, the operator is required to have a sufficient knowledge about the command execution result.

An article entitled "High-Speed Compact Image-Processing System, TOSPIX", Toshiba Review, Vol. 38, No. 6, 1983, pp. 488–492, discribes the ability of a high-speed hardware function for executing a conversational command including pixel manipulations, such as logical summation between pixels, and geometric manipulations of pictures, such as affine transformation, but it describes nothing about the development of picture processing procedures on a trial-and-error basis.

Another article entitled "Visual System Autovision II with Robot Language RAIL", Image Information Industrial, Vol. 15, No. 5, May 1983, pp. 31–42, discribes a man-machine interface of a picture processing system which processes picture information picked up with a camera and controls a robot on the basis of the result of the process, but it describes nothing about the development of picture processing procedures on a trial-and-error basis.

SUMMARY OF THE INVENTION

It is an object of the present invention to provide a conversational picture processing system which allows the operator to evaluate or verify the result of the process for each input command on a trial-and-error basis thereby to facilitate the development of picture processing procedures.

Another object of the invention is to provide a conversational picture processing system which allows the operator to easily evaluate or verify the output picture as a result of processing upon execution of each picture processing command.

The picture processing system according to the present invention is provided therein with a temporary memory for storing temporarily inputted picture processing commands, besides a memory for registering picture processing commands, and when the operator inputs picture processing commands, the system holds the command in the temporary memory, and also executes the command automatically and displays the result of command execution, so that the operator can verify the result of the process on the display. The operator is allowed to enter several picture processing commands, execute each stored command to find the best result on a trial-and-error basis, and specify the command which the operator thinks best so that it is read out of the temporary memory into the command registration memory.

The temporary memory of the picture processing system according to the present invention is addressed in correspondence to the location in the command registration memory where a command is to be registered, so that after the operator has selected a command in the temporary memory and registered it, the temporary memory is automatically made corresponding to the next registration position of the registration memory, whereby the operator does not need to take notice of the correspondence between the temporary memory and the location of registration in the registration memory during the development of a picture processing procedure.

The picture processing system according to the present invention is designed to perform the development of a picture processing procedure in two separate phases. The first phase is to verify the execution result of picture processing commands on a trial-and-error basis, and the second phase is to store a selected command in a registration command list memory so that it is used as a step of a picture processing procedure. In the verification phase, each input picture processing command is executed automatically and the resultant output picture is displayed on the screen. Picture processing commands are stored in a temporary command list memory, so that the results of command execution can be evaluated on a trial-and-error basis without affecting the command list memory for storing picture processing procedure. In the command registration phase, a picture processing command determined to be best by the operator is picked up in the temporary command list memory and stored in the command list memory. This operating scheme effectively facilitates the development of picture processing procedures.

BRIEF DESCRIPTION OF THE DRAWINGS

These and other objects and advantages of the present invention will become more apparent from the following description taken in conjunction with the accompanying drawings, in which.

DESCRIPTION OF THE PREFERRED EMBODIMENT

Figure 1:
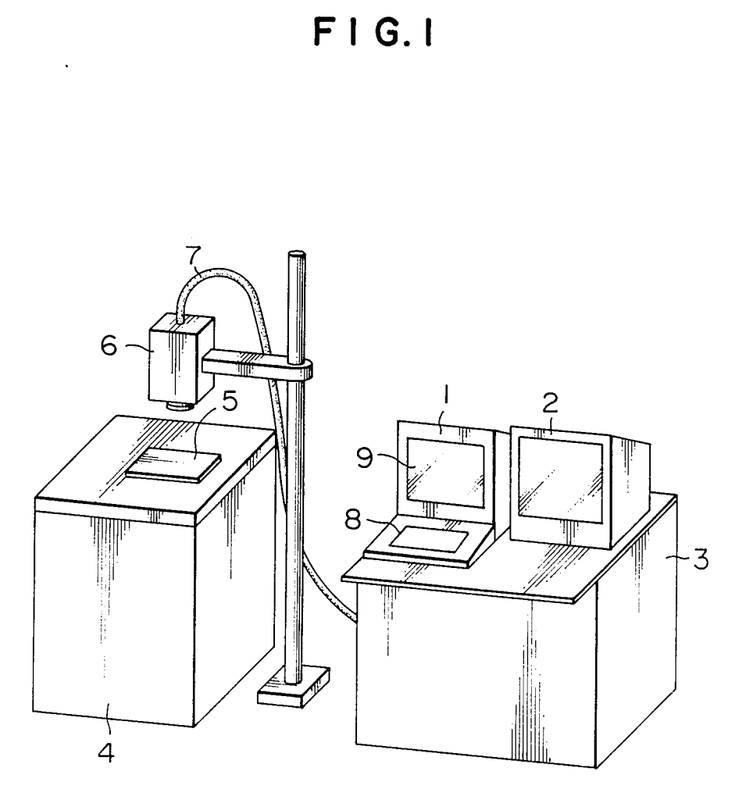
FIG. 1 is an external view of the picture processing system according to the present invention.

An embodiment of the present invention will now be described with reference to the drawings. FIG. 1 shows an external view of an embodiment of the picture processing system according to the present invention. In FIG. 1, the picture processing system consists of an input unit 1, a picture display unit 2 and a data processing unit 3. An object 5 of picture processing placed on a desk 4 is shot by a camera 6, and the picture signal produced by the camera 6 is sent over a cable 43 to the processing unit 3, and then a picture of the object 5 is displayed on the picture display unit 2. Picture information may be inputted to the system in other methods than those using a camera.

The operator inputs a picture processing command through a keyboard 8 attached to the input until 1 and, upon confirmation of the operation on the display screen 9, inputs the command to the data processing unit 3. The picture processing command in this operation can be, for example, SMT $x_1$, $x_2$, $x_3$ (where $x_1$, $x_2$ and $x_3$ are decimal numbers) for the case of the smoothening operation for removing noises on the image, or FXB for the case of the fixed binarization operation for dealing with the picture in the binary monochrome signal. The processing unit 3 executes the picture processing command and displays the resultant picture on the picture display unit 2, allowing the operator to verify a step of the picture processing procedure.

Figure 2:
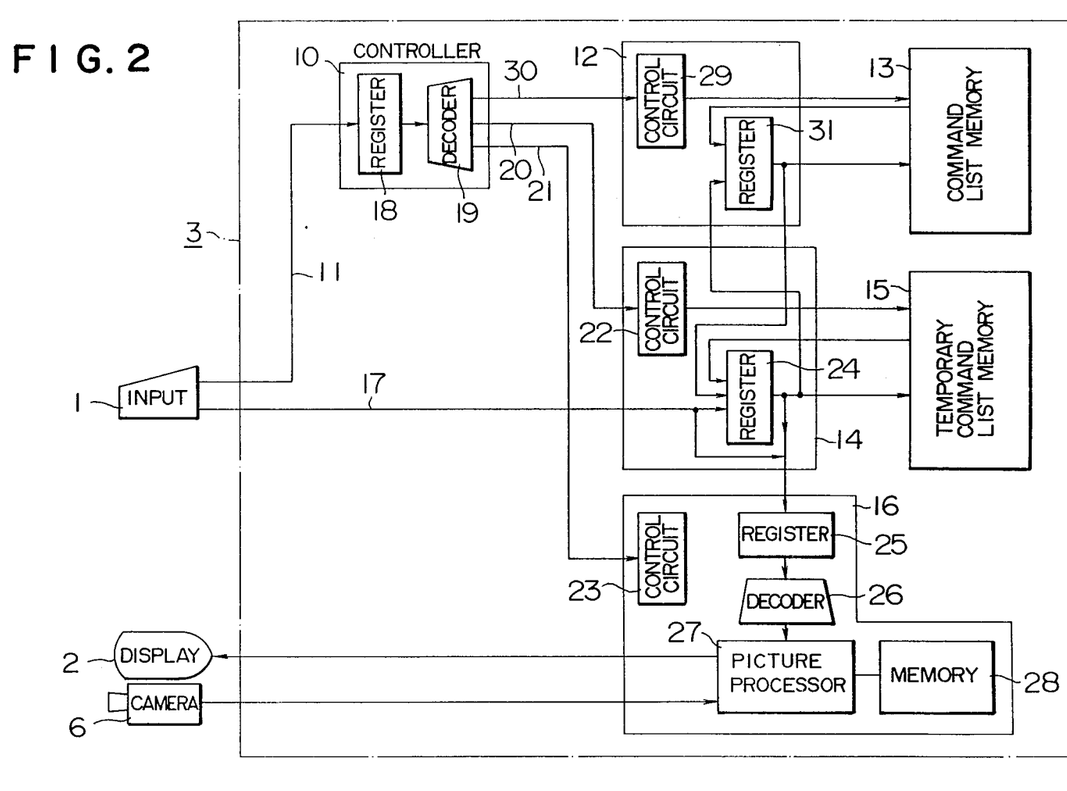
FIG. 2 is a block diagram showing the internal arrangement of the system.
Figure 3:
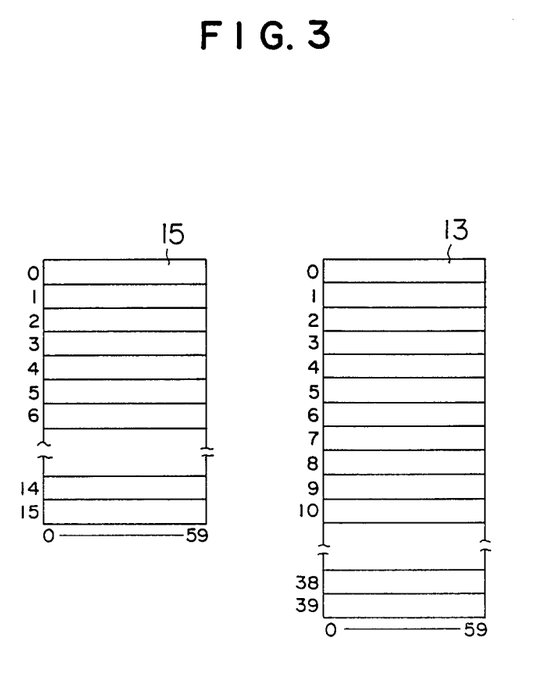
FIG. 3 is a diagram showing the arrangement of the command memories shown in FIG. 2.

In FIG. 2, the processing unit 3 incorporates a controller 10, which interprets operator's commands sent from the input unit 1 over a line 11 and activates various sections in the processing unit 3 for implementing the command. A command input/output controller 12 transacts picture processing commands with a command list memory 13, which is a memory provided for storing a series of picture processing commands describing a picture processing procedure and has a capacity of 40 commands as shown in FIG. 3. Each picture processing command is expressed as a data character string of 60 bytes.

A temporary command input/output control 14 transacts picture processing commands with a temporary command list memory 15 by calculating the address of the memory 15. The temporary command list memory 15 stores temporarily picture processing commands inputted by the operator through the input unit 1, and has a capacity of 16 commands as shown in FIG. 3.

A command executor 16 receives the picture signal from the camera 6 and, initially, sends the picture signal of an original picture to the picture display unit 2. In case a picture processing command is entered, the command executor 16 generates a picture display command for displaying the result of the process for the picture processing command, executes the entered picture processing command and the generated picture display command, and sends the result of such execution to the picture display unit 2.

In FIG. 2, picture processing commands entered from the input unit 1 to the processing unit 3 are sent over a command line 17 to the temporary command input/output control 14, while operating commands for instructing the process are sent from the input unit 1 to the controller 10 over the line 11. The operating command is latched by a register 18 in the controller 10 and decoded by a decoder 19, which then issues the temporary command input/output control signal and execution control signal over lines 20 and 21 to control circuits 22 and 23 in the temporary command input/output control 14 and command executor 16, respectively. In response to the control signal, the temporary command input/output control 14 latches the picture processing command from the input unit 1 in its register 24, and then stores the command in the memory 15 addressed by the control circuit 22 and, at the same time, transfers it to a register 25 in the command executor 16. In the command executor 16, the picture processing command held in the register 25 is fed to a decoder 26, which then generates a picture display command for displaying the result of process for the picture processing command and supplies these two commands to a picture processor 27. The picture processor 27 has an associated memory 28 for storing picture information which is in this case picture information originating from the camera 6 and processed through the execution of a series of picture processing commands stored in the command list memory 13. The picture processor 27 performs picture processing for the stored picture information in accordance with the picture processing command given by the decoder 26, and subsequently performs picture display processing in accordance with the picture display command given by the decoder 26, and then sends the result to the display unit 2.

When the operator intends to reexecute a picture processing command stored in the temporary command list memory 15, he operates the keyboard 8 to issue an operating command for instructing the reexecution and specifying the picture processing command to be reexecuted to the controller 10, which in turn decodes the command and issues the command output control signal indicative of the address of the picture processing command to the temporary input/output command control 14 and, at the same time, issues the command execution control signal to the command executor 16. The temporary command input/output control 14 reads out the specified picture processing command from the memory 15 into the register 24, and transfers it to the command executor 16. The command executor 16 executes the picture processing command and picture display command, and sends the result to the picture display unit 2 as in the same way when the picture processing command is inputted.

If a picture processing command stored in the temporary command list memory 15 is to be registered in the command list memory 13, the operator operates the keyboard 8 to issue operating commands for instructing the registration and specifying the picture processing command to the controller 10. The controller 10 decodes the commands and issues the command input control signal and temporary command output control signal over lines 30 and 20 to the control circuits 29 and 22 in the command input/output control 12 and temporary command input/output control 14, respectively. The temporary command input/output control 14 reads out the specified picture processing command from the memory 15 into the register 24, then transfers it to the command input/output control 12. The control 12 latches the command in its register 31, and then stores it in the command list memory 13 addressed by the control circuit 29.

The temporary command input/output control 14 memorizes as a current address the address of a picture processing command in the temporary command list memory 15, which command is inputted by the operator, so that it is used to read out a picture processing command from the memory 15 for the command reexecution or registration if the operator does not specify the address. After a picture processing command has been registered in the command list memory 13, the current address memorized in the control circuit 22 is cleared and the address of the command list memory 13 held in the control circuit 28 in the command input/output control 12 is updated to the address indicating the next storage location.

It is possible to execute a picture processing command entered through the input unit 1 without storing it in the temporary command list memory 15, and if the operator instructs this operating mode through the keyboard, the controller 10 decodes the operating command and sends a control signal to the control circuit 22 in the temporary command input/output control 14 indicative of the direct transfer of the entered picture processing command to the command executor 16 and also sends the command execution control signal to the command executor 16. Then, the temporary command input/output control 14 sends the entered picture processing command directly to the command executor 16, which in turn performs the process in the same way as when the picture command is inputted and sends the resultant picture signal to the picture display unit 2.

It is possible for the system to have an additional function for reading out a specific picture processing command from the command list memory 13 into the temporary command list memory 15. In this case, the controller 10 decodes the operator's command from the input unit 1 to issue the command output control signal indicative of the specified command to the control circuit 29 in the command input/output control 12 and, at the same time, the temporary command input control signal to the control circuit 22 in the temporary command input/output control 14. Consequently, the command input/output control 12 reads out the specified picture processing command from the command list memory 13 into its register 31, and then transfers it to the register 24 in the temporary command input/output control 14, which in turn stores the command in the temporary command list memory 15 at the address next to the current address memorized in the control circuit 22.

Next, the development of the picture processing procedure will be described.

(1) Procedure development

Figure 4:
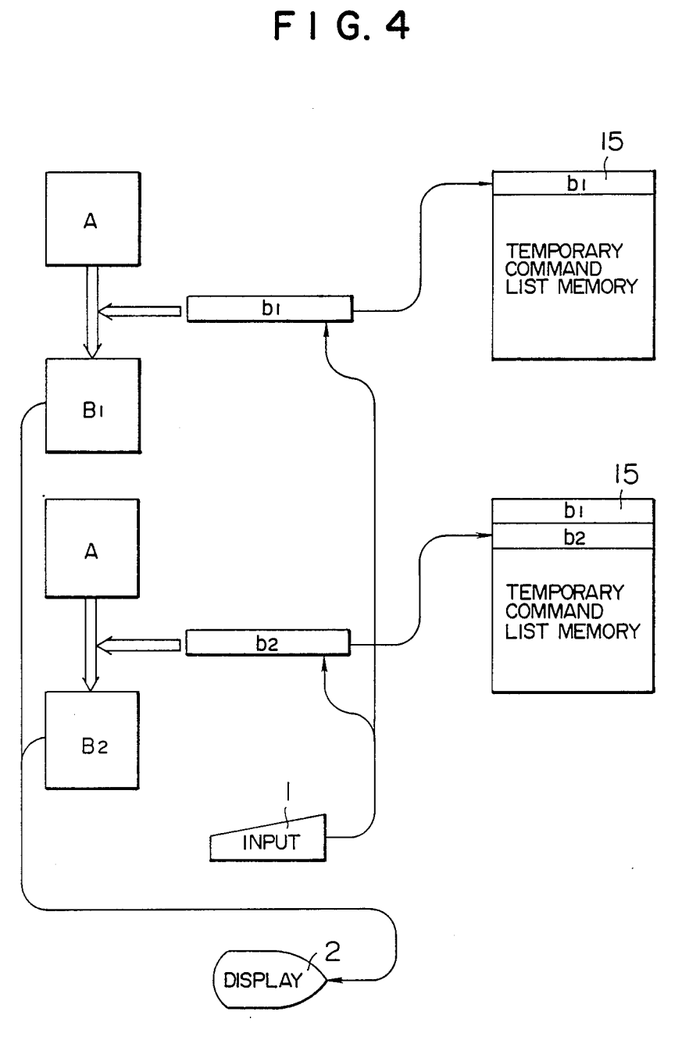
FIG. 4 is a diagram used to explain the operation of inputting picture, processing commands.
Figure 5:
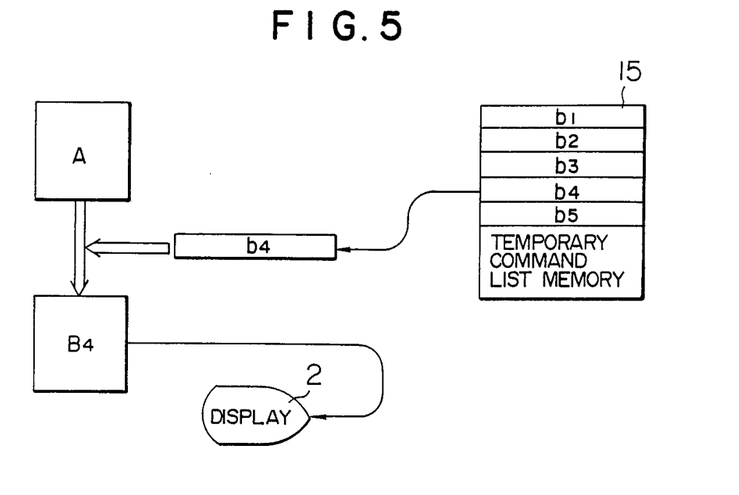
FIG. 5 is a diagram used to explain the operation for reexecuting a picture processing command.
Figure 6:
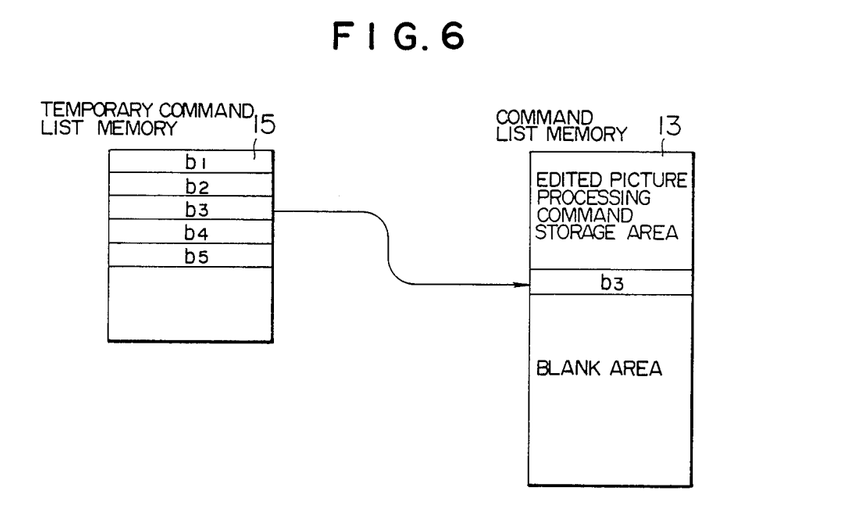
FIG. 6 is a diagram used to explain the operation for registering a picture processing command.

FIGS. 4, 5 and 6 show the method of developing a picture processing procedure by use of the system according to the present invention. The command list memory 13 in FIG. 2 stores a series of picture processing commands describing a picture processing procedure which has been produced up to an intermediate point of a complete procedure, and as a result of such processing, an output picture A is obtained as shown in FIG. 4. The following describes the method of determining a step of picture processing procedure for the entry of the picture A. The operator can designate any of three operating commands, that is, the commands of entry, reexecution and registration.

FIG. 4 shows the operation which takes place when the operator enters picture processing commands b1 and b2. After the operator has entered the command b1 through the input unit 1, it is executed automatically and an output picture B1 is displayed on the picture display unit 2. At the same time, the command b1 is stored in the temporary command list memory 15. If the operator determines the command b1 to be improper as a step of the picture processing procedure by viewing the picture B1 on the display unit 2, he is allowed to enter another picture processing command b2. The new command b2 is executed in the same way as of the previous command b1 and stored in the temporary command list memory 15. In this embodiment, a maximum of 16 picture processing commands can be stored in the temporary command memory 15.

FIG. 5 shows the state that picture processing commands b1, b2, . . . , and b5 have been stored in the temporary command list memory 15 through the conversational input operation, and the system operation when the operator has instructed the reexecution of command b4. After the operator has entered the reexecution command and the address of the temporary command list memory 15 where the command b4 resides, the command b4 is executed and the output picture B4 is displayed on the picture display unit 2.

FIG. 6 shows the system operation when the operator has instructed the registration of the picture processing command b3. On determining that the command b3 is the best choice as a step of the picture processing procedure, the operator inputs the registration command and the address of the temporary command list memory 15 where the command b3 resides, and then the command b3 is stored in the command list memory 13. After the command has been stored in the command list memory 13, the temporary command list memory 15 is cleared, and the operator is allowed to enter picture processing commands for determining the next step of the picture processing procedure.

(2) Processing procedure

Figure 7:
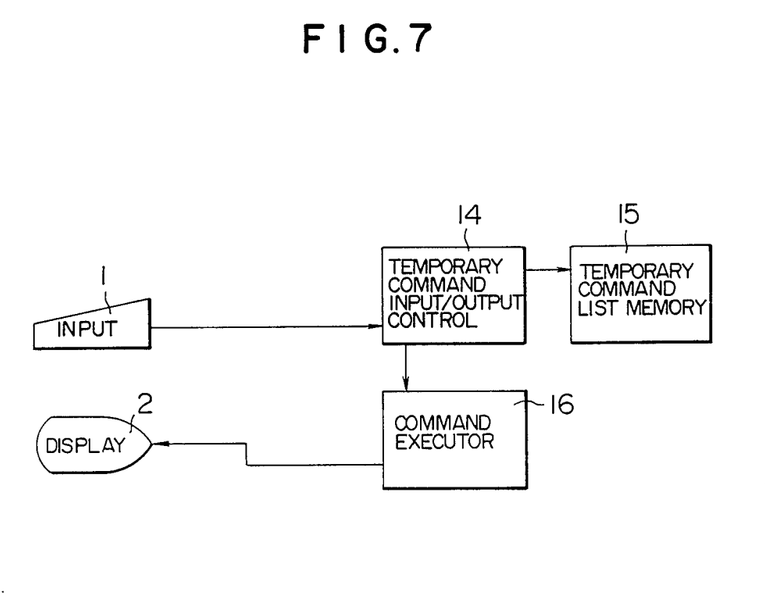
FIG. 7 is a diagram used to explain the data flow during the entry of a picture processing command.
Figure 8:
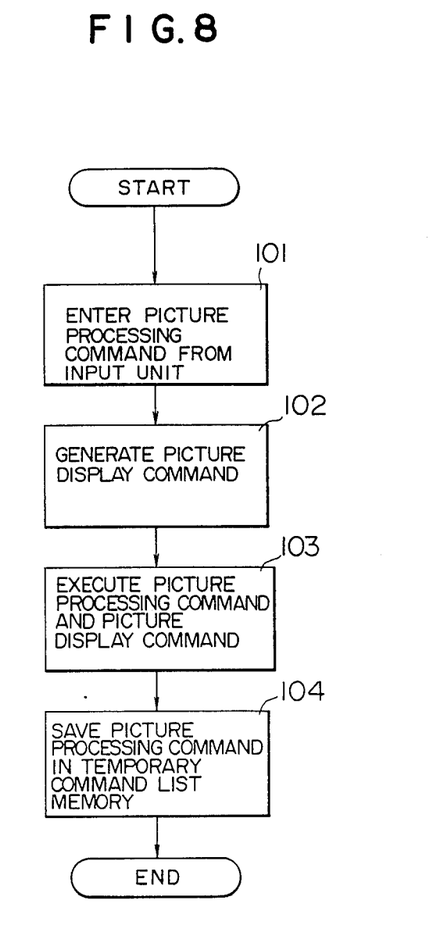
FIG. 8 is a flowchart showing the process for inputting a picture processing command.

FIG. 7 shows the data flow between the system components when the operator has inputted a picture processing command, and FIG. 8 shows a flowchart of the system operation for this process. The first block 101 in the flowchart indicates that the system receives a picture processing command entered by the operator through the input unit 1. The entered command is delivered to the temporary command input/ output control 14 as shown in FIG. 7.

Block 102 indicates that the command executor 16 generates the picture display command for displaying the result of process for the inputted picture processing command. Block 103 indicates the execution of the picture processing command and the picture display command. Block 104 indicates that the temporary command input/output control 14 operates on the temporary command list memory 15 to store the picture processing command. The address of the temporary command list memory 15 is under control of the temporary command input/output controller 14 in this operation, and it is initialized to 0 at the beginning of each step determination process and incremented by one each time another picture processing command is entered. In this embodiment, the memory 15 has addresses 0–15, and addressing beyond 15 causes itself to return to address 0.

The address of the temporary command list memory 15 to be accessed during the process is dealt with as a current address, and when a picture processing command is entered, the address of the temporary command list memory 15 where the command is to be stored is set to the current address.

(3) Reexecution

Figure 9:
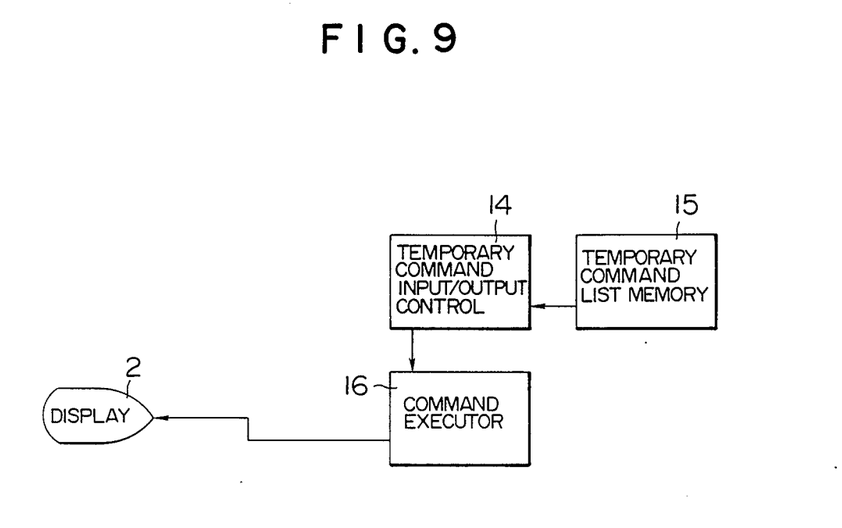
FIG. 9 is a diagram used to explain the data flow during the reexecution of a picture processing command.
Figure 10:
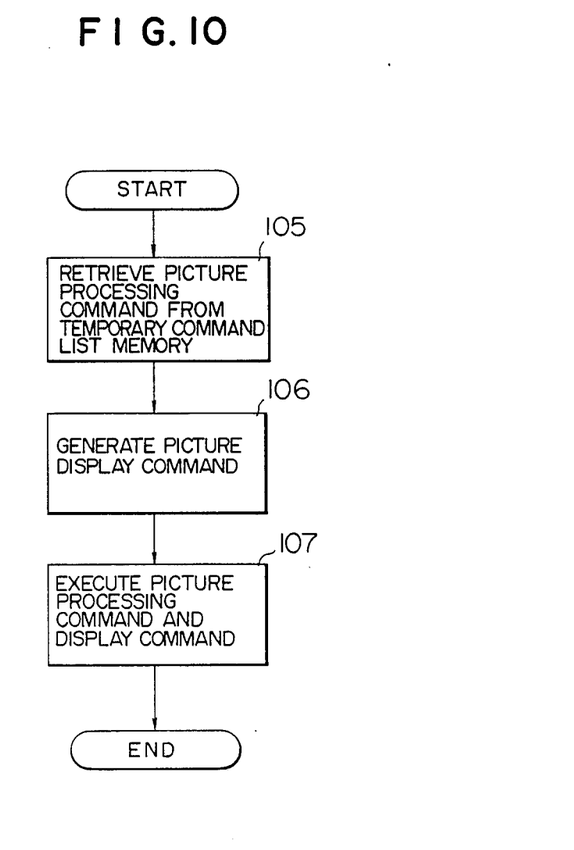
FIG. 10 is a flowchart showing the process for reexecuting picture processing command.

FIG. 9 shows the data flow between the system components when the operator instructs the reexecution of a specific picture processing command in the temporary command list memory 15, and FIG. 10 shows a flowchart of the system operation for this process. The first block 105 in FIG. 10 indicates that the temporary command input/output control 14 retrieves a picture processing command from the specified address location of the temporary command list memory 15. At this time, the specified address is set as a current address. If the operator does not specify the address, it is assumed that the operator designated the current address which has been stored in the system. Blocks 106 and 107 are the same processes as blocks 102 and 103, respectively, of FIG. 8.

(4) Registration

Figure 11:
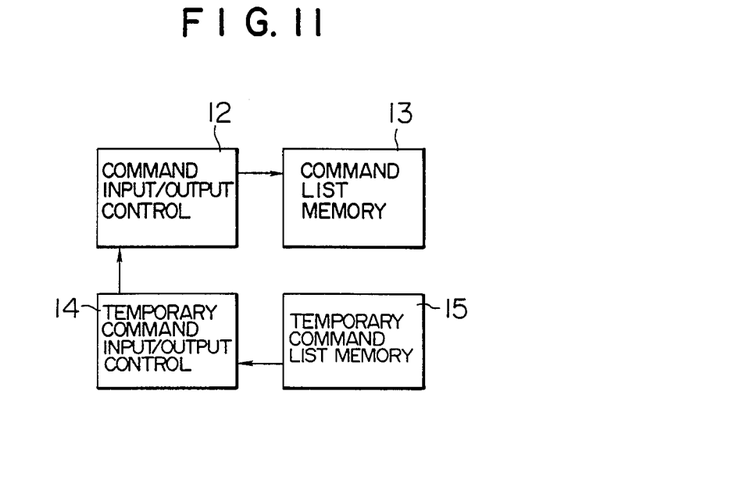
FIG. 11 is a diagram used to explain the data flow during the registeration of picture processing command.
Figure 12:
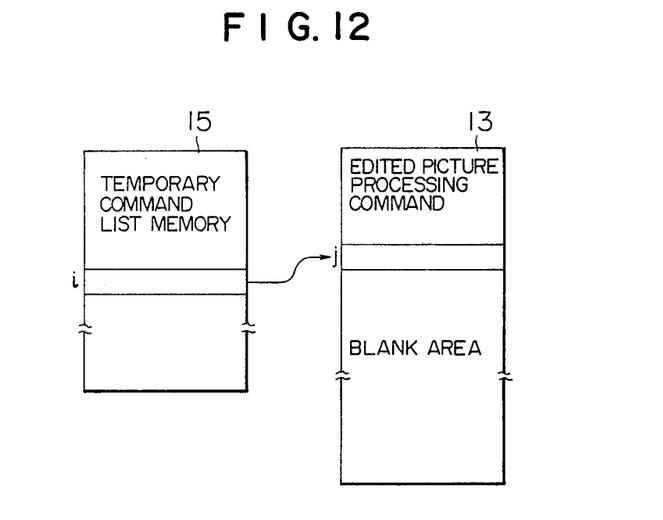
FIG. 12 is a diagram used to explain the operation for registering picture processing command.
Figure 13:
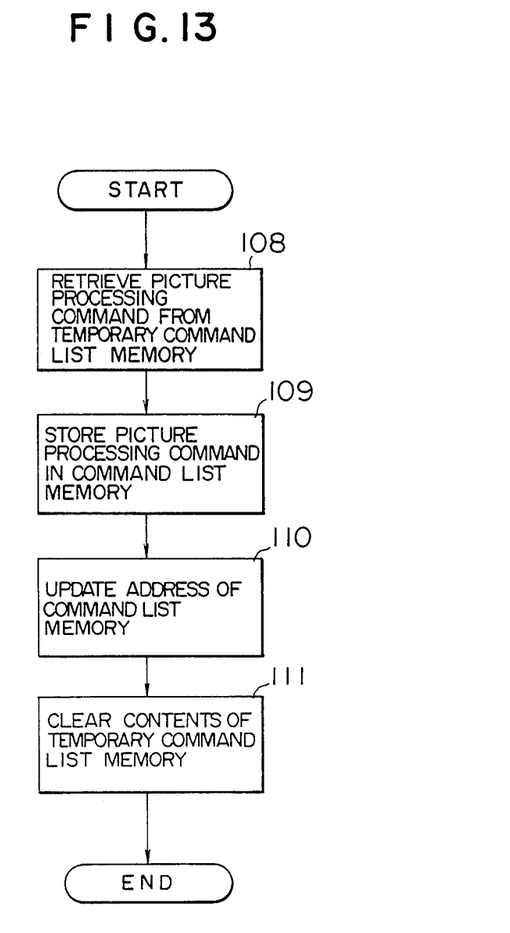
FIG. 13 is a flowchart showing the process for registering picture processing command.

FIG. 11 shows the data flow between the system components when the operator instructs the registration of a specific picture processing command in the temporary command list memory 15, FIG. 12 shows the operation of transferring the command to be registered from the temporary command list memory 15 into the command list memory 13, and FIG. 13 shows a flowchart of the system operation for this process. The first block 108 in FIG. 13 indicates that the temporary command input/output control 14 retrieves the picture processing command from the specified address location i of the memory. 15 as shown in FIGS. 11 and 12. The input unit 1 displays on its screen the list of picture processing command numbers that have been entered by the operator, and the operator specifies one of picture processing commands by designating the corresponding number. If the operator does not specify the address, it is assumed that the operator designated the current address. Block 109 indicates that the command input/output control 12 receives the retrieved command from the temporary command input/output control 14 and stores it in address location j of the command list memory 13 as shown in FIG. 11. The address of the command list memory 13 is under control of the command input/output control 12, and it is initialized to 0 when the task of creating a picture processing procedure has started and incremented by one each time a picture processing command is registered. The memory 13 has addresses 0–39, and addressing beyond 39 causes the error which halts the operation.

Blocks 110 and 111 indicate the initializing process carried out prior to the determination of the next step of the picture processing procedure. The block 110 updates the address of the command list memory 13, while the block 111 clears the temporary command list memory 15 and, at the same time, initializes the address of the memory 15.

The following describes the effectiveness of the foregoing embodiment. Each picture processing command entered by the operator through the input unit 1 (FIG. 1) is executed automatically and its output picture is displayed on the picture display unit 2. The operator is allowed to check the output picture merely by entering a picture processing command. The entered picture processing command is stored in the temporary command list memory 15, and the command list memory 13 for storing a picture processing procedure is not affected. This allows the operator to verify the result of process of each picture processing command during the development of a picture processing procedure on a trial-and-error basis.

The operator can reexecute any picture processing command by specifying the address of the temporary command list memory 15, so that the output picture resulting from the command is displayed on the picture display unit 2. This allows the operator to readily compare the output picture resulting from picture processing commands stored in the temporary command list memory 15.

Any picture processing command stored in the temporary command list memory 15 can be retrieved and stored in the command list memory 13 by specifying the address of the memory 15 where the command resides. This allows the operator to register in the command list memory 13 a specific picture processing command considered to be the best choice as a step of the picture processing procedure from among the commands stored in the temporary command list memory 15. Through the iteration of the foregoing operations, pictures produced as a result of process for picture processing commands can be evaluated and verified on a trial-and-error basis, whereby a picture processing procedure can be developed easily.

Figure 14A:
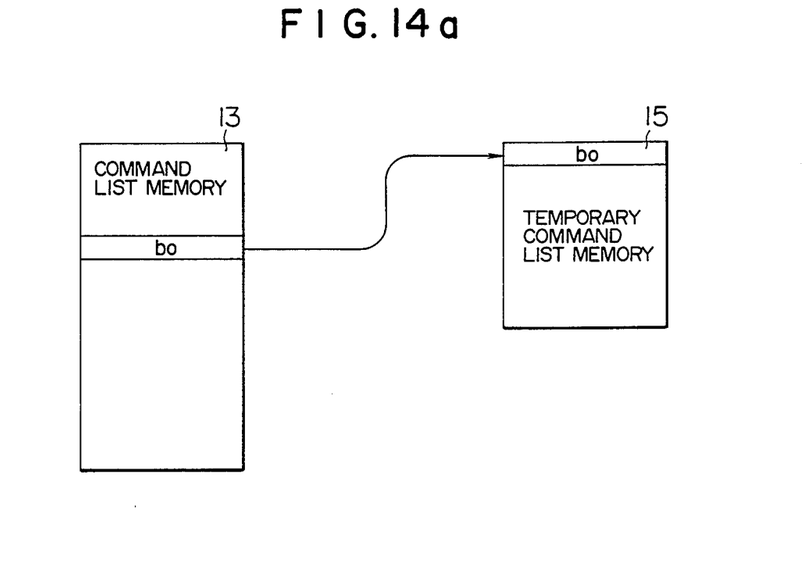
FIGS. 14a and 14b are diagram used to explain the operation of command verification and modification.
Figure 14B:
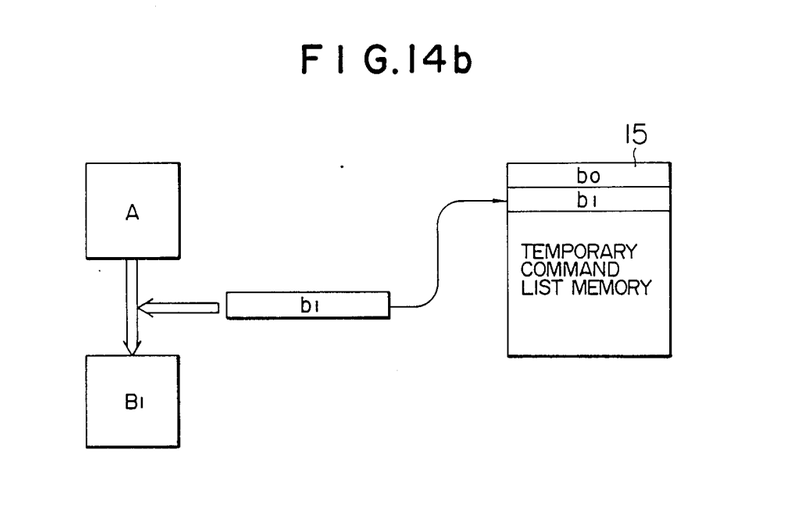

Next, another embodiment of this invention will be described. This is a method of verifying each of the steps of a completed picture processing procedure and modifying any step if needed. FIG. 14a shows the data flow from the command list memory 13 to the temporary command list memory 15, and FIG. 14b shows the operation for displaying a command to be modified and storing a modified command into the temporary command list memory 15. In FIGS. 14a and 14b, a series of picture processing commands are already stored in the command list memory 13, and it is assumed that the verification has been conducted sequentially from the first step up to the command immediately preceding command b0, with a picture A displayed as a result of the verification process.

When the system enters the process for the verification of picture processing command b0, it is transferred to the top of the temporary command list memory 15 automatically. Thereafter, the same operations as the previous embodiment occur. Namely, at this point, the operator can input an operating command such as entry, reexecution and registration through the input unit 1. If it is intended to advance the step of the picture processing procedure following the verification of the result of process for a picture processing command, the operator will instruct the system to perform reexecution and registration. For the modification of the picture processing command b0, an alternative picture processing command b1 is entered. The command b1 is executed automatically and stored in the temporary command list memory 15. These operations are repeated until an optimal picture processing command is reached, and it is registered in the command list memory 13 to replace the original command b0.

Figure 15:
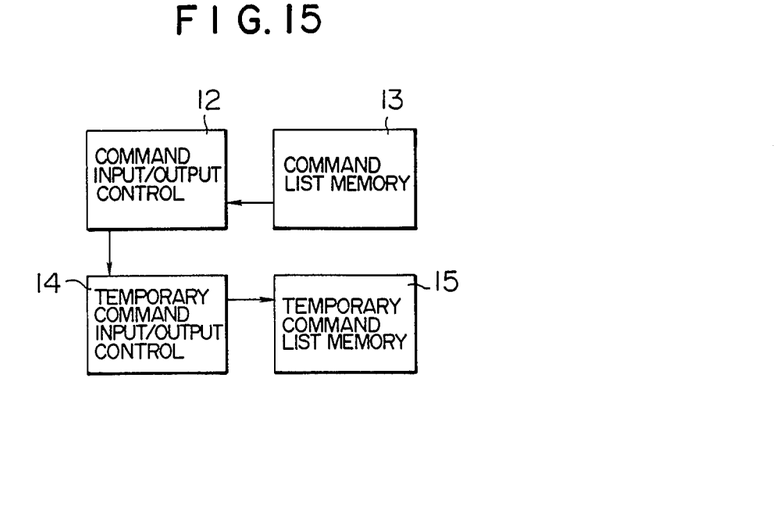
FIG. 15 is a diagram showing the data flow during the command verification and modification.
Figure 16:
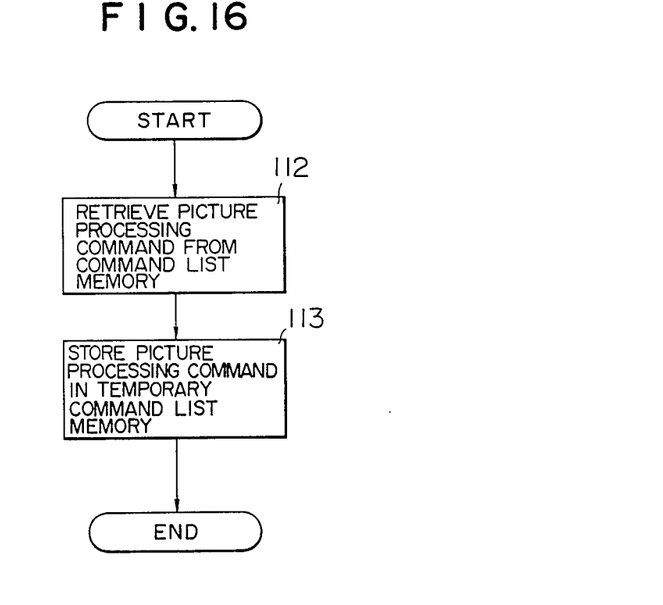
FIG. 16 is a flowchart showing the process of command verification and modification.

FIG. 15 shows the data flow between the system components when a picture processing command is retrieved from the command list memory 13 and stored in the temporary command list memory 15, and FIG. 16 shows a flowchart of the system operation for this process. The first block 112 in FIG. 16 indicates that the command input/output control 12 retrieves a picture processing command from a specified address location of the command list memory 13. Block 113 indicates that the temporary command input/output control 14 stores the above command in the top address location of the temporary command list memory 15. Thereafter, the storing address of the temporary command list memory is incremented by one.

According to this embodiment, a series of picture processing commands which have been produced are stored in the temporary command list memory 15, one step at a time, allowing the operator to reexecute or register each command in the same way as in dealing with a newly entered picture processing command. Thus, the operator can verify each step of a complete picture processing procedure and modify any step if needed.

While particular embodiments of the invention have been shown and described, it will be obvious to those skilled in the art that various changes and modifications may be made without departing from the present invention in its broader aspects.

We claim:

1. A conversational picture processing system comprising:
   an input unit including means operable by an operator for inputting information including picture processing commands and operating commands;
   a temporary storage unit for temporarily storing picture processing commands received from said input unit;
   a command list storage unit for storing picture processing commands to be registered;
   an execution unit including means for storing picture data and means for executing a picture processing command received from said input unit or said temporary storage unit on said picture data in said storing means;
   control means for controlling said execution unit to control execution of a picture processing command inputted through said input unit or read from said temporary storage unit, for storing a picture processing command into or reading a picture processing command from said temporary storage unit or said command list storage unit, and for transferring a selected picture processing command from said temporary storage unit to said command list storage unit, in response to respective operating commands entered through said input unit; and
   a picture display unit connected to said execution unit for displaying processed picture data obtained as a result of execution of a picture processing command by said execution unit.

2. A system according to claim 1, wherein said execution unit includes means for producing a picture display command at a time of executing a picture processing command, and wherein said executing means executes both of said picture processing command and said picture display command concurrently.

3. A system according to claim 1, wherein said control means comprises means responsive to an operating command to supply a picture processing command entered through said input unit to said execution unit so that said command is executed, to display the result of execution on said picture display unit, and to store said picture processing command in said temporary storage unit.

4. A system according to claim 1, wherein said control means comprises means responsive to an operating command to read any one of the picture processing commands stored in said temporary storage and to supply the read command to said execution unit so that said command is executed, whereby the result of execution is displayed on said picture display unit.

5. A system according to claim 1, wherein said control means comprises means responsive to an operating command to read any one of picture processing commands stored in said command list storage unit and to store the command in said temporary storage unit.

6. A system according to claim 1, wherein said control means comprises means responsive to an operating command to supply a picture processing command inputted through said input unit to said execution unit so that said command is executed, so as to display the result of execution on said picture display unit.

* * * * *